Patented Nov. 28, 1933

1,936,831

UNITED STATES PATENT OFFICE 1,936,831

PROCESS FOR PREPARING ESTERS OF HIGH GRAVITY FROM CASTOR OIL

Cosimo Rosselli Del-Turco, Paris, France, assignor of one-half to the French Society Legendre Vin & Guetet, Paris, France No Drawing. Application March 23, 1932, Serial No. 600,832, and in Germany April 7, 1931

5 Claims. (Cl. 87—12)

It is already known that lubricating oils of high gravity can be obtained by polymerizing hydroxy-fatty acids or unsaturated fatty-acids and then proceeding to the esterification of the fatty acids so polymerized with esters of hydroxy-fatty acids.

So, for instance it has been proposed to prepare triricinoleic acid (by heating to 356° F. ricinoleic acid) and then esterifying it at a temperature higher than 392° F. with the glyceride of ricinoleic acid, which castor oil is for the most part, composed of.

I have now found that it was possible to prepare, from castor oil a product, mixable in all proportions in the mineral oils, having a high viscosity and composed of esters of very high gravity by a process much simpler than any one known up to date.

By the process I have found, I esterify the hydroxy-fatty acid with the glycerides of the hydroxy-fatty acids with the temperature going to 482° F. without having previously transformed the hydroxy-fatty acid into triricinoleic acid by a very economic industrial development.

Since by this process polymerized fatty acids are not used, it is not necessary to isolate fatty acids and it is then much preferable to proceed to a partial splitting of the castor oil, following the modalities generally used in the splitting of fatties, until the acidity of the product, read into oleic acid, comes to 40 or 60%, the remainder being constituted by untransformed triglycerides and also by a certain quantity of diglycerides and monoglycerides.

Now, then, it is known that this degree of splitting may be got to by a very short operation and it comes out from it that the unity of fatty acid free in the partially split oil is of a very low cost.

By then re-heating the product resulting from the partial splitting of the initial oil (after having previously eliminated the glycerine which has been formed during the splitting) an esterification is obtained since the free hydroxyls alcoholic groups in the unsplit of uncompletely transformed ricinoleic glycerides come into a reaction with the carboxyls groups of the free fatty acids with elimination of water; other secondary reactions may also take place.

The esterification may be favoured by accelerating means known for this kind of reaction; that is to say be the action of the pneumatic void, of nonoxidizing gas and vapours, by dehydrating agents, by catalytic agents, etc.

By this process I obtain a product composed of esters of the ricinoleic acid having a high gravity, product of considerable viscosity, a very good unctuousness and the property to give with the mineral oils, in all proportions, very steady mixings, i. e.: 600 kgs. castor oil are put in a leaden or wooden vat; to this are added 420 kgs. of water, 6 kgs. of sulfuric acid 66 Bé., and 6 kgs. of a fat splitting agent. All this is then heated by direct injection of steam for 4 or 5 hours of boiling until the free acidity read in oleic acid be of about 50%.

When the desired degree of splitting is reached the steam is stopped and, by decanting, the inferior layer of liquid containing sulfuric acid and part of the glycerine which was combined with the initial oil, can be taken off.

The upper layer of liquid, which is composed of fatty acid and a mixing of triglycerides not transformed and mono and di-glycerides, is washed in water until the mineral acid is completely eliminated. This result obtained the product is put into an aluminium vat which is connected, by a condenser of the fumes freed during the progressive process of esterification, to a vacuum pump. The aluminium vat is re-heated on the outside, taking care that the temperature of the liquid may rise very slowly until it reaches 482° F. and the pression be the lowest possible inside the apparatus.

The heating is continued (at a higher temperature if necessary), until the desired degree of esterification is obtained. During this operation one observes the elimination of the water of reaction together with a regular lowering of the indice of the acidity of the product.

If this product, toward the end of the process, shows a percentage in free fatty acids yet too high, it is advisable to add neuter castor oil, while still heating until the desired grade of neutrality is obtained.

Having now described my invention, what I claim as new and desire to secure by Letters Patent is:

1. A process for preparing esters of high gravity from castor oil which comprises partially splitting castor oil, eliminating the glycerine from the mixture thus obtained and heating the remainder whereby esterifying same.

2. A process for preparing esters of high gravity from castor oil which comprises partially splitting castor oil, eliminating the glycerine and slowly heating the remainder to very progressively carry its temperature up to about 482° F. whereby obtaining esters of very high gravity.

3. A process for preparing esters of high gravity from castor oil which comprises partially splitting castor oil, eliminating the glycerine from the mixture thus obtained, heating the remainder whereby esterifying same, finally adding neutral castor oil and heating the whole until the desired grade of neutrality is obtained.

4. A process for preparing esters of high gravity from castor oil, which comprises partially splitting castor oil until the free acidity, read in oleic acid be within the range of about 40 to 60 per cent, eliminating the glycerine and heating the remainder, whereby esterifying same.

5. A process for preparing esters of high gravity from castor oil, which comprises adding to castor oil, water, a small amount of sulphuric acid and of a fat splitting agent, then heating the whole to partially split castor oil eliminating glycerine from the mixture thus obtained and progressively reheating the remainder, so as to slowly but constantly increasing its temperature whereby esterifying same.

COSIMO ROSSELLI DEL-TURCO.